(12) United States Patent
Krishnakumar

(10) Patent No.: US 10,318,177 B2
(45) Date of Patent: Jun. 11, 2019

(54) COMPARTMENTALIZED LINKED LIST FOR FAST ACCESS

(71) Applicant: SAP SE, Walldorf (DE)

(72) Inventor: Arjun Krishnakumar, Ernakulam (IN)

(73) Assignee: SAP SE, Walldorf (DE)

( * ) Notice: Subject to any disclaimer, the term of this patent is extended or adjusted under 35 U.S.C. 154(b) by 213 days.

(21) Appl. No.: 14/944,006

(22) Filed: Nov. 17, 2015

(65) Prior Publication Data

US 2017/0139611 A1 May 18, 2017

(51) Int. Cl.
*G06F 12/02* (2006.01)
*G06F 3/06* (2006.01)

(52) U.S. Cl.
CPC .......... *G06F 3/0613* (2013.01); *G06F 3/0619* (2013.01); *G06F 3/0665* (2013.01); *G06F 3/0685* (2013.01); *G06F 12/023* (2013.01); *G06F 12/0223* (2013.01); *G06F 2212/1041* (2013.01)

(58) Field of Classification Search
None
See application file for complete search history.

(56) References Cited

U.S. PATENT DOCUMENTS

| | | | |
|---|---|---|---|
| 2004/0107227 A1* | 6/2004 | Michael | G06F 9/5016 |
| 2008/0021908 A1* | 1/2008 | Trask | G06F 17/30949 |
| 2009/0327372 A1* | 12/2009 | Ylonen | G06F 12/0253 |
| 2012/0158729 A1* | 6/2012 | Mital | G06F 15/167 707/738 |

* cited by examiner

*Primary Examiner* — Charles Rones
*Assistant Examiner* — Ryan Dare
(74) *Attorney, Agent, or Firm* — Schwegman Lundberg & Woessner, P.A.

(57) ABSTRACT

A method includes creating multiple logical compartments in a data storage device to hold respective multiple portions of an ordered list of elements, encapsulating each element, of a portion for each compartment, in a node with pointers to successive nodes in the portion, creating a set of references to a first node in each compartment, and providing a count of the number of elements in each compartment.

20 Claims, 4 Drawing Sheets

COMPARTMENTALIZED LINKED LIST FOR FAST ACCESS

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A linked list is a data structure that contains a list of data items. Each item, referred to as a node, includes a link to the next item in the list. The linked list itself may be referred to simply by providing a pointer to the first and/or last node of the list, allowing the linked list to be traversed in either direction. An array list is generally a list of items in a contiguous portion of storage. Access to an item in the array list may be obtained by simply specifying an offset for the item from the beginning of the list providing random access to the item. Choosing between a linked list versus an array list is a usual dilemma in the implementation phase of any application that needs to deal with considerable amounts of data. Each type of list has its pros as well as cons, but choosing one over the other inevitably leads to a set of scenarios where the implementation compromises on performance.

The Java Platform, Standard Edition provides ArrayList and LinkedList as part of its java.util package for developers' convenience. The difference in performance between the two are negligible when working with lists of small size (of the order of a few hundreds), but as the size increases, it becomes more and more prominent.

ArrayLists use an internal array to store the list data. Arrays provide the best performance for random access, as the address of every element can be calculated by adding an offset to the base address of the array. This makes finding the address of the nth item or element in the list as easy as base_address+(n*size of element). But this creates another problem—every element must be put in consecutive memory locations without any gaps in between. Insertion and deletion of elements becomes extremely expensive as a result. If, for example, an array has 100 elements, to insert an element in index 0, 100 elements will be relocated one position to the right internally in the memory. The same goes for deletion, with every succeeding element being shifted one position to the left. ArrayList also suffers when the internal array is completely full, and therefore have to create a bigger array and reallocate all the elements.

LinkedLists do not have the constraint that they should be arranged sequentially in the memory. Each node in LinkedList contains a pointer or reference to the memory location of the next node in the list. Hence, the nodes may be completely scattered in memory, and the list will still be functional. This also saves the hassle of having to find contiguous blocks of free space in the memory to allocate to the list. The primary advantage of this design has to do with insertion and deletion of items in the list. Inserting a new item in the list is simply a matter of changing the pointer of the previous node to point to the new node, and assigning the pointer in the new node to point to the next node. Similarly, deletion also requires only changing one pointer. This gives insertion/deletion a constant time complexity of O(1). The tradeoff, however, is in random access. To access the nth node in a list, one will have to traverse through n−1 nodes before that node (since the LinkedList maintains only pointers to head and the tail of the list, and nowhere in between). Size wise, LinkedList will occupy more space since each node will have two additional pointer references in it (to the previous node, and the next node).

SUMMARY

A method includes creating multiple logical compartments in a data storage device to hold respective multiple portions of an ordered list of elements, encapsulating each element, of a portion for each compartment, in a node with pointers to successive nodes in the portion, creating a set of references to a first node in each compartment, and providing a count of the number of elements in each compartment.

A computer implemented method includes receiving a request to access an nth element in an ordered list managed by a programmed computer as a set of compartments containing linked elements, using a set of compartment references to identify, via the computer, a first linked element in a compartment in which the nth element resides, and using the links in the linked elements within the compartment to navigate to the nth element.

A machine readable storage device has instructions for execution by a processor of the machine to perform operations including creating multiple logical compartments in a data storage device to hold respective multiple portions of an ordered list of elements, encapsulating each element, of a portion for each compartment, in a node with pointers to successive nodes in the portion, creating a set of references to a first node in each compartment, and providing a count of the number of elements in each compartment.

A device includes a processor and a memory device coupled to the processor. The memory devices includes a program for execution by the processor to cause the processor to perform operations. The operations include creating multiple logical compartments in a data storage device to hold respective multiple portions of an ordered list of elements, encapsulating each element, of a portion for each compartment, in a node with pointers to successive nodes in the portion, creating a set of references to a first node in each compartment, and providing a count of the number of elements in each compartment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

An ordered list of data items is managed as a set of compartments containing multiple of the data items in the list. Such a managed list is referred to as a LeapList. Each of the data items in a compartment are stored as a linked list, with each data item pointing to the next data items in the list. A pointer to the beginning of each compartment, as well as a sized of each compartment is maintained to enable access to a desired item by jumping to the compartment containing the desired item and then traversing the linked list within the compartment to find the desired item. Insertion of an item into the list may be done in the same manner as for a linked list, by simply modifying pointers of items on either side where the item is inserted in a compartment and adding pointers to the inserted item. In addition, the compartment size may be updated to reflect the addition of an item.

The compartments and data in the compartments may be stored in a data storage device. A data storage device may include random access memory on a computer or multiple computers, disk drives, tape drives, optical drives, or other means of storing data accessible by a computer. Cloud based storage may be used in further embodiments.

Figure 1:
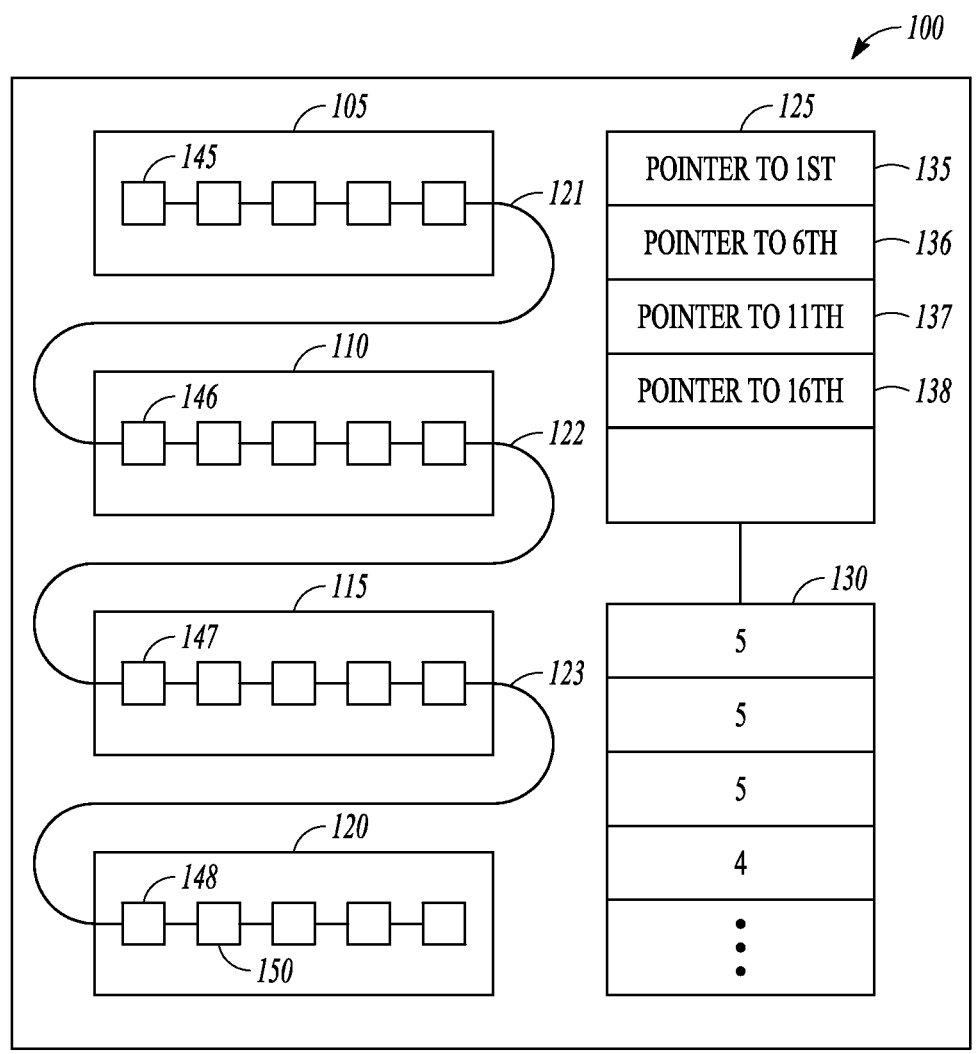
FIG. 1 is a block diagram of a LeapList data structure for storing an ordered list of elements according to an example embodiment.

FIG. 1 is a block diagram of a simple example of a list management structure referred to as a LeapList indicated generally at 100. LeapList 100 includes multiple compartments 105, 110, 115, and 120. Each compartment contains a number of linked items. In one embodiment, a last linked item in a compartment contains a pointer indicated at 121, 122, and 123 to the first linked item in the next compartment such that the entire list is linked. In addition, LeapList 100 also maintains an additional set of references indicated at 125 that point to the beginning of each compartment. The LeapList 100 further maintains a compartment count list 130 indicating the size of each compartment, i.e., how many linked items, also referred to as nodes, are present in a particular compartment. Note that a compartment may also be referred to as a carriage, and the compartment count may be referred to as a carriage size.

In one example LeapList 100, a list contains 19 items or elements, and has a beginning compartment size of 5, also referred to as the nominal count. The set of references 125 contains a list with pointers 135, 136, 137, and 138 to the first, sixth, eleventh and sixteenth items, i.e., the beginning of each compartment indicated by items 145, 146, 147, and 148 respectively. The compartment count list 130 is maintained to track the number of items in each compartment. In this example, the compartment count list 130 will have values {5,5,5,4}, indicating that the first, second and third compartments 105, 110, and 115 have five elements each (i.e., nodes or items 1-15), but the last compartment 120 has only four (16-19).

Figure 2:
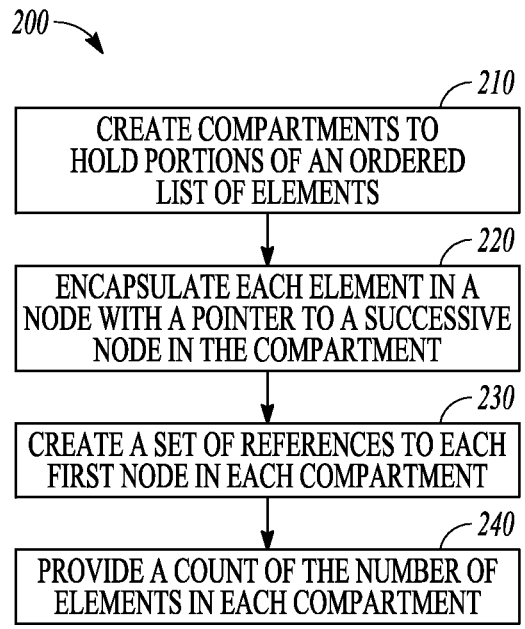
FIG. 2 is a flowchart representation of a method for creating a LeapList according to an example embodiment.

FIG. 2 is a flowchart illustrating a method 200 of creating a LeapList from an ordered list of elements. At 210, multiple logical compartments are created for storage in a data storage device. Each compartment may hold a respective portion of the ordered list of elements. At 220, each element in each portion is encapsulated in a node with pointers to successive nodes in the respective portion. If the elements are already in a LinkedList, they may already be encapsulated, and method 200 simply breaks the list into suitable portions, such as a nominal count of 5 to 50 or more elements for each compartment in one embodiment. In a further embodiment, the nominal count of elements in each compartment may be about 10 elements give or take one or two elements.

At 230, a set of references to a first node in each compartment is created. The references may comprises a logical or physical address for such first nodes in various embodiments for either direct or indirect referencing. At 240, a count of the number of elements in each compartment is provided. The count may be the nominal number in most instances, with a last compartment optionally having less than the nominal number. The count may alternatively be expressed as a deviation from a nominal count. In one embodiment, nodes in a compartment may optionally include a pointer to a previous node in the compartment to facilitate navigations forwards and backwards within a compartment.

Figure 3:
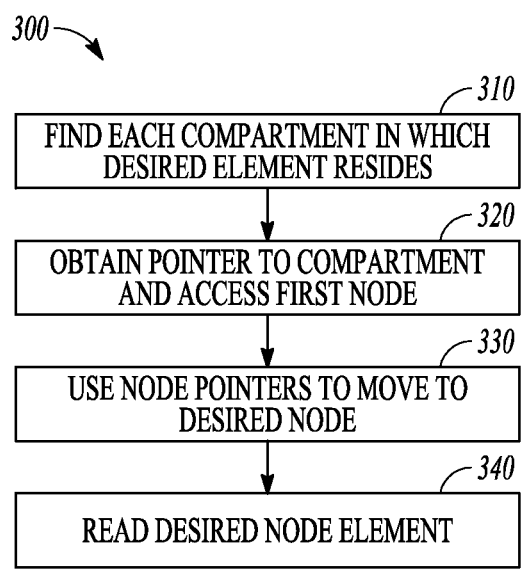
FIG. 3 is a flowchart representation of a method for accessing elements in a LeapList according to an example embodiment.

A LeapList makes random access of a desired element in the list much simpler as shown in a method 300 shown in flowchart form in FIG. 3. Accessing the 17 element in the list may be accomplished by finding the compartment in which the nth, or $17^{th}$ element in this example resides at 310. In the example LeapList 100, the $17^{th}$ element resides in the fourth compartment 120 at 150. The compartment may be found by scanning the set of references 125 and finding the pointer that points to the highest element below the desired element, or by simply adding numbers in the compartment count list until just before the sum exceeds the $17^{th}$ element. Other methods of finding the compartment may also be used.

The fourth compartment may be accessed directly at 320 using the pointer 138, which points to the first element 148 in the fourth compartment. The first element 148 corresponds to the $16^{th}$ item in the list, and contains a pointer to the next node containing the $17^{th}$ item. The items and their pointers may be referred to as nodes in one embodiment. To obtain the $17^{th}$ item 150, the next item pointer in the $16^{th}$ node is used at 330 to move forward once to the next node to reach the $17^{th}$ element in the list. The $17^{th}$ element may then be read at 340. It may be noted that a LinkedList would have to traverse 16 nodes before it arrives at the destination. In the LeapList 100, only one node is traversed, in addition to the compartment lookup.

Figure 4:
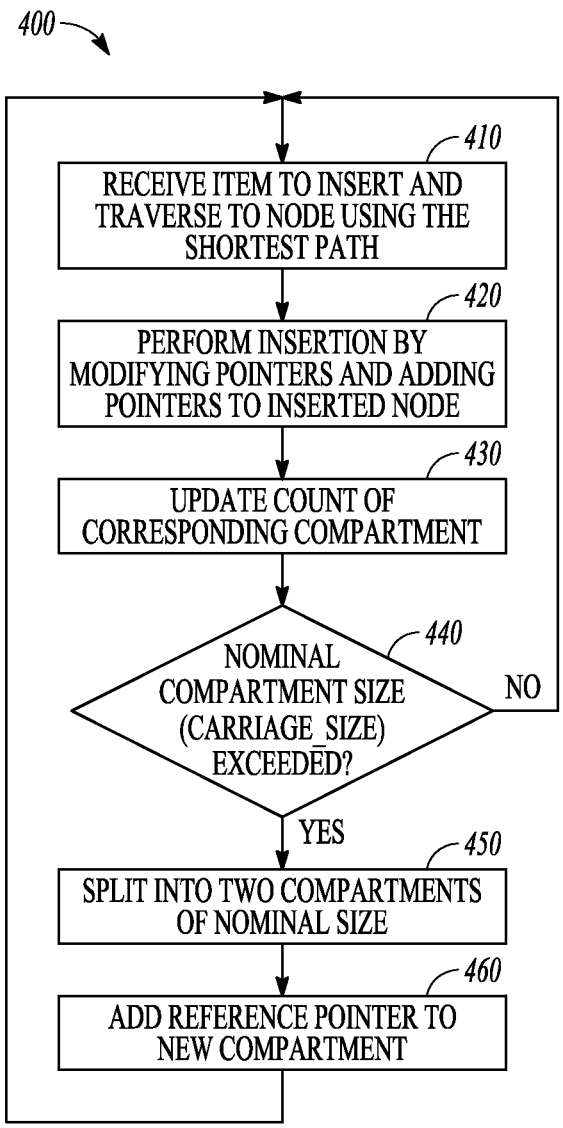
FIG. 4 is a flowchart representation of a method for inserting elements into a LeapList according to an example embodiment.

FIG. 4 is a flowchart illustrating a method 400 of inserting an mth element into LeapList 100. Insertion of an item in LeapList 100 may be dealt with by traversing to a desired node at 410 using the shortest possible path, i.e., by jumping directly to the compartment and moving through next nodes. Method 400 then performs the insertion operation as a LinkedList does at 420 by modifying the pointers associated with the nodes between which the element is inserted, such as nodes m−1 and current node m, which now becomes node m+1, and adding pointers to the inserted element, the new mth element, that point to such nodes, forming an inserted node. Method 400 also updates the size or count of that compartment at 430 in the compartment count list 130. The insertion may be made either before or after the node traversed to in various embodiments. Items may also be removed in a similar manner, modifying the pointers in the remaining nodes to ensure the nodes remaining in a compartment are properly linked to each other.

If the size of any compartment exceeds twice a value referred to as a CARRIAGE_SIZE as indicated at 440, it may be split into two compartments at 450, and a new pointer may be added at 460 to the new compartment. The old compartment remains, but the new compartment is created and half the nodes from the old compartment are transferred to the new compartment. Note that if there are an odd number of nodes, one of the compartments may have a different number of elements than the nominal size. On completion of splitting the old compartment or if the size has not been exceeded, method 400 returns to 410 to wait for a request to be received to add an item.

The CARRIAGE_SIZE is a default value for the size of the compartments, and may vary from a few elements to hundreds or thousands of elements. Larger sizes may result in longer random access times, as more nodes may need to be traversed within a compartment to find the desired element. A size of about 50 elements (plus or minus 4 or 5 elements) may be used in one embodiment to provide acceptable random access times yet not significantly increase overhead associated with managing the set of references 125 or counts 130. The number of items in the list may exceed several hundred thousand in some embodiments. As the size of the list increases, LeapList may not have the additional overhead of memory relocation whenever the size of the list gets too large, unlike array lists. With lists of 100,000 entries or more, LeapList may be able to perform random accesses over 100 times faster than LinkedList on average. In various embodiments, LeapList provides much better random access times that linked lists, and much better insertion performance than array lists, provide a good scalable solution for list management.

Figure 5:
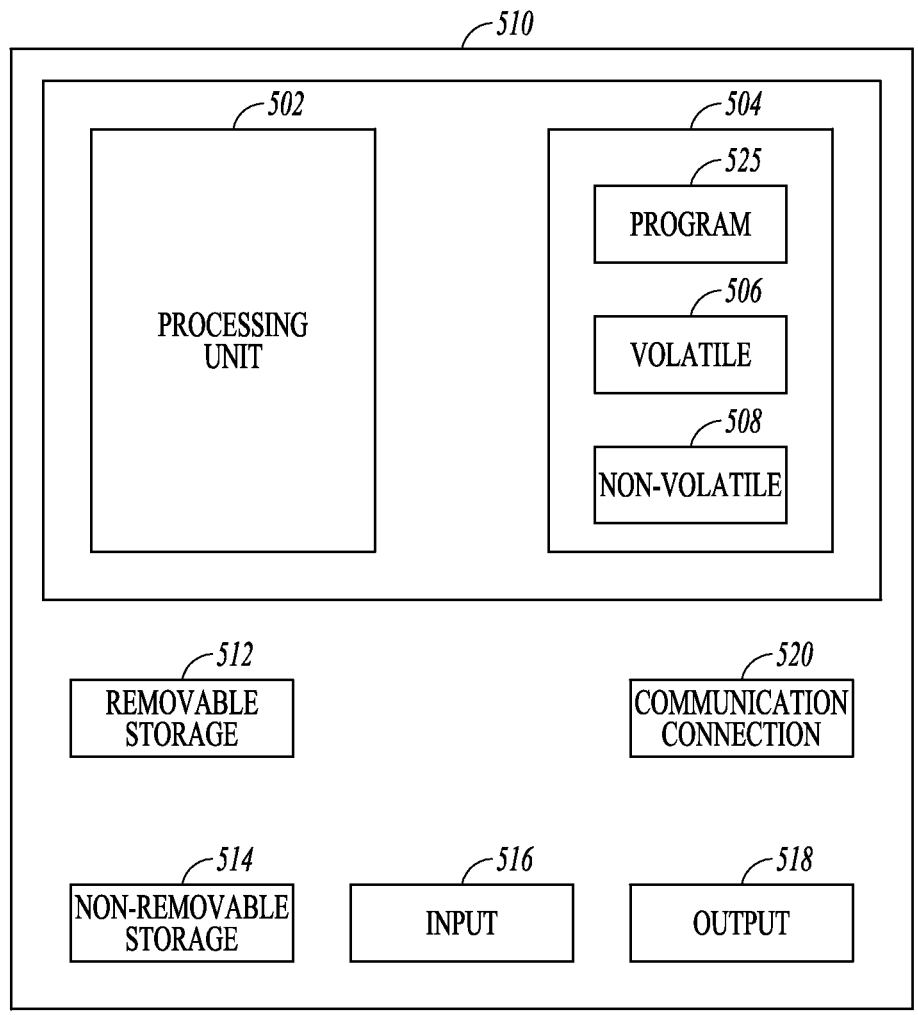
FIG. 5 is a block diagram of a system for managing a LeapList and providing access to element in the LeapList according to an example embodiment.

FIG. 5 is a block schematic diagram of a computer system 500 to create and manage LeapLists according to example embodiments. All components need not be used in various embodiments. One example computing device in the form of a computer 500, may include a processing unit 502, memory 503, removable storage 510, and non-removable storage 512. Although the example computing device is illustrated and described as computer 500, the computing device may be in different forms in different embodiments. For example, the computing device may instead be a smartphone, a tablet, smartwatch, or other computing device including the same or similar elements as illustrated and described with regard to FIG. 5. Devices such as smartphones, tablets, and smartwatches are generally collectively referred to as mobile devices. Further, although the various data storage elements are illustrated as part of the computer 500 where one or more LeapLists may be stored, the storage may also or alternatively include cloud-based storage accessible via a network, such as the Internet.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

Computer 500 may include or have access to a computing environment that includes input 506, output 504, and a communication connection 516. Output 504 may include a display device, such as a touchscreen, that also may serve as an input device. The input 506 may include one or more of a touchscreen, touchpad, mouse, keyboard, camera, one or more device-specific buttons, one or more sensors integrated within or coupled via wired or wireless data connections to the computer 500, and other input devices. The computer may operate in a networked environment using a communication connection to connect to one or more remote computers, such as database servers, including cloud based servers and storage. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable storage device are executable by the processing unit 502 of the computer 500 to implement one or more of the methods described and illustrated in the flowcharts. A hard drive, CD-ROM, and RAM are some examples of articles including a non-transitory computer-readable medium such as a storage device. The terms computer-readable medium and storage device do not include carrier waves. For example, a computer program 518 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 500 to provide generic access controls in a COM based computer network system having multiple users and servers.

EXAMPLES

1. A method comprising:
creating multiple logical compartments in a data storage device to hold respective multiple portions of an ordered list of elements;
encapsulating each element, of a portion for each compartment, in a node with pointers to successive nodes in the portion;
creating a set of references to a first node in each compartment; and
providing a count of the number of elements in each compartment.

2. The method of example 1 wherein nodes in a compartment include a pointer to a previous node.

3. The method of any of examples 1-2 and further comprising:
receiving a request to access an nth element in the ordered list;

using the set of references to identify a first node in a compartment in which the nth element resides; and using the pointers in the nodes to navigate to the nth element.

4. The method of any of examples 1-3 and further comprising:

receiving a request to insert an mth element in the ordered list between two elements in the ordered list;

using the set of references to identify a first node in a compartment in which the mth−1 element resides;

using the pointers in the nodes to navigate to the mth−1 element;

inserting the mth element by:
creating an mth node with pointers to the mth−1 node and a previous mth node;
updating a pointer in the mth−1 node to point to the mth node; and
updating a pointer in the previous mth element to point to the mth node.

5. The method of any of examples 1-4 and further comprising:

determining that a first compartment has grown to twice the size of a nominal compartment;

breaking the first compartment into two compartments;

updating the set of references to identify a first node in each of the two compartments; and updating a count of the number of elements in each of the two compartments.

6. The method of example 5 wherein breaking the compartment into two compartments comprises dividing the elements in the first compartment into two sets of elements of substantially equal length.

7. The method of any of examples 1-6 wherein the count has a nominal value of about 50.

8. The method of any of examples 1-7 wherein the count has a nominal value greater than 50.

9. The method of any of examples 1-8 wherein the count has a nominal value of between about 10 and 50.

10. A computer implemented method comprising:

receiving a request to access an nth element in an ordered list managed by a programmed computer as a set of compartments containing linked elements;

using a set of compartment references to identify, via the computer, a first linked element in a compartment in which the nth element resides; and using the links in the linked elements within the compartment to navigate to the nth element.

11. The method of example 10 and further comprising reading the nth element.

12. A machine readable storage device having instructions for execution by a processor of the machine to perform a method comprising:

creating multiple logical compartments in a data storage device to hold respective multiple portions of an ordered list of elements;

encapsulating each element, of a portion for each compartment, in a node with pointers to successive nodes in the portion;

creating a set of references to a first node in each compartment; and providing a count of the number of elements in each compartment.

13. The machine readable storage device of example 12 wherein nodes in a compartment include a pointer to a previous node in the compartment.

14. The machine readable storage device of any of examples 12-13 wherein the method further comprises:

receiving a request to access an nth element in the ordered list;

using the set of references to identify a first node in a compartment in which the nth element resides; and using the pointers in the nodes to navigate to the nth element.

15. The machine readable storage device of any of examples 12-14 wherein the method further comprises:

receiving a request to insert an mth element in the ordered list between two elements in the ordered list;

using the set of references to identify a first node in a compartment in which the mth−1 element resides;

using the pointers in the nodes to navigate to the mth−1 element;

inserting the mth element by:
creating an mth node with pointers to the mth−1 node and a previous mth node;
updating a pointer in the mth−1 node to point to the mth node; and
updating a pointer in the previous mth element to point to the mth node.

16. The machine readable storage device of any of examples 12-15 wherein the method further comprises:

determining that a first compartment has grown to twice the size of a nominal compartment;

breaking the first compartment into two compartments;

updating the set of references to identify a first node in each of the two compartments; and updating a count of the number of elements in each of the two compartments.

17. The machine readable storage device of example 16 wherein breaking the compartment into two compartments comprises dividing the elements in the first compartment into two sets of elements of substantially equal length.

18. A device comprising:
a processor; and
a memory device coupled to the processor and having a program stored thereon for execution by the processor to cause the processor to perform operations comprising:
creating multiple logical compartments in a data storage device to hold respective multiple portions of an ordered list of elements;
encapsulating each element, of a portion for each compartment, in a node with pointers to successive nodes in the portion;
creating a set of references to a first node in each compartment; and
providing a count of the number of elements in each compartment.

19. The device of example 18 wherein nodes in a compartment include a pointer to a previous node in the compartment.

20. The device of any of examples 18-19 wherein the operations further comprise:

receiving a request to access an nth element in the ordered list;

using the set of references to identify a first node in a compartment in which the nth element resides; and using the pointers in the nodes to navigate to the nth element.

21. The device of any of examples 18-20 wherein the operations further comprise:

receiving a request to insert an mth element in the ordered list between two elements in the ordered list;

using the set of references to identify a first node in a compartment in which the mth−1 element resides;

using the pointers in the nodes to navigate to the mth−1 element;
  inserting the mth element by:
  creating a new mth node with pointers to the mth−1 node and a previous mth node;
  updating a pointer in the mth−1 node to point to the new mth node; and
  updating a pointer in the previous mth node to point to the new mth node.

22. The device of any of examples 18-21 wherein the operations further comprise:
  determining that a first compartment has grown to twice the size of a nominal compartment;
  breaking the first compartment into two compartments;
  updating the set of references to identify a first node in each of the two compartments; and
  updating a count of the number of elements in each of the two compartments.

23. The device of example 22 wherein the operation of breaking the first compartment into two compartments comprises dividing the elements in the first compartment into two sets of elements of substantially equal length.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The following is example code in Java for one implementation of a LeapList:

```
© SAP SE
import java.util.ArrayList;
public class LeapList<V> {
    protected Node<V> head, tail;
    protected long size;
    private ArrayList<CarriageNode<V>> carriagePointers = new ArrayList<CarriageNode<V>>( ); // additional pointers to the beginning of each compartment
    private ArrayList<Integer> carriageSizes = new ArrayList<Integer>( );
    // List to keep track of compartment sizes
    public static int CARRIAGE_SIZE = 50; // default size of a compartment or carriage.
    public LeapList( ) {
        head = null;
        tail = null;
        size = 0;
    }
    /**
     * Used to get the contents of the list in the same format as
     LinkedList.toString( )
     * @return String
     */
    public String getListAsString( ){
        StringBuffer str = new StringBuffer("");
        if(head != null){
            Node<V> current = head;
            str.append("["+current.getElement( ));
            while(current.getNext( ) != null){
                current = current.getNext( );
                str.append(", " + current.getElement( ));
            }
            str.append("]");
        }
        return str.toString( );
    }
    /**
     * Prints the element at the beginning of each compartment
     */
    public void showCarriages( ) {
        System.out.println("\nCarriages : ");
        for( CarriageNode<V> node : carriagePointers) {
            System.out.print(node.getCarriageStart( ).getElement( ) +
                ", ");
        }
    }
    /**
     * Gets the sizes of compartments as a String
     * @return
     */
    public String getCarriageSizes( ){
        return carriageSizes.toString( );
    }
    /**
     * Adds the given Node<V> at the specified index in the list
     * @param index
     * @param node
     */
    public void add(int index, Node<V> node) {
        if(head != null){
            if(index == 0){
                addFirst(node);
                return;
            } else if(index == size-1){
                add(node);
                return;
            }
            int sum = 0;
            int i=0;
            int carriageSize;
            int carriageIndex = 0;
            Node<V> current;
            while(sum < index){
                carriageIndex = i;
                sum += carriageSizes.get(i++);
            }
            sum −= carriageSizes.get(carriageIndex);
            carriageSize = carriageSizes.get(carriageIndex);
            current =
            carriagePointers.get(carriageIndex).getCarriageStart( );
            for(int k = 0; k < index − sum − 1; k++){
                current = current.getNext( );
            }
            node.setNext(current.getNext( ));
            current.setNext(node);
            if(carriageSize == 2 * CARRIAGE_SIZE){ // If carriage size exceeds 2 * CARRIAGE_SIZE with the addition of the new node, split the compartment into two
                Node<V> curr =
                carriagePointers.get(carriageIndex).getCarriageStart( );
                for(int k=0; k< CARRIAGE_SIZE; k++){
                    curr = curr.getNext( );
                }
                CarriageNode<V> carriagePointer = new
                CarriageNode<V>(curr);
                carriagePointers.add(carriageIndex+1, carriagePointer);
                carriageSizes.set(carriageIndex, CARRIAGE_SIZE);
                carriageSizes.add(carriageIndex+1,
                    CARRIAGE_SIZE+1);
            } else {
                carriageSizes.set(carriageIndex,carriageSize+1);
            }
            size++;
        }
    }
    /**
     * Adds the given Node<V> to the first position in the list
     * @param node
     */
    public void addFirst(Node<V> node) {
        if (tail == null)
            tail = node;
        node.setNext(head);
        head = node;
        int carriageSize = carriageSizes.get(0);
        carriageSizes.set(0, carriageSize + 1);
        carriagePointers.set(0, new CarriageNode<V>(node));
        size++;
```

-continued

```
}
/**
 * Adds the given Node<V> at the end of the list
 * @param node
 */
public void add(Node<V> node){
    if(tail == null){
        CarriageNode<V> pointer = new CarriageNode<V>(node);
        carriageSizes.add(1);
        carriagePointers.add(pointer);
        tail = node;
        node.setNext(head);
        head = node;
    } else {
        int lastIndex = carriageSizes.size( )-1;
        int lastSize = carriageSizes.get(lastIndex);
        if(lastSize == 2 * CARRIAGE_SIZE){ // If a carriage has exceeded maximum capacity
            carriageSizes.set(lastIndex, CARRIAGE_SIZE);
            carriageSizes.add(CARRIAGE_SIZE);
            carriageSizes.add(1);
            CarriageNode<V> lastPointer = carriagePointers.get(lastIndex); // this pointer will be used to split a carriage into two, and will point to the middle element of the existing 2*SIZE sized carriage
            Node<V> newCarriageStartNode = lastPointer.getCarriageStart( );
            for(int i =0; i<CARRIAGE_SIZE; i++){ // traverse to the middle of the current carriage
                newCarriageStartNode = newCarriageStartNode.getNext( );
            }
            CarriageNode<V> newCarriagePointer = new CarriageNode<V>(newCarriageStartNode);
            carriagePointers.add(newCarriagePointer);
            node.setNext(null);
            tail.setNext(node);
            tail = node;
            carriagePointers.add(new CarriageNode<V>(node));
        } else {
            node.setNext(null);
            tail.setNext(node);
            tail = node;
            carriageSizes.set(lastIndex, lastSize+1);
        }
    }
    size++;
}
/**
 * Gets the element at the specified index
 * @param index
 * @return
 */
public Node<V> get(int index){
    int sum = 0;
    int i=0;
    if(index > size)
        return null;
    while(sum <= index){
        sum += carriageSizes.get(i++);
    }
    sum -= carriageSizes.get(i-1);
    Node<V> node = carriagePointers.get(i-1).getCarriageStart( );
    for(int k=0; k < index-sum; k++)
    {
        node = node.getNext( );
    }
    return node;
}
}
```

The invention claimed is:

1. A method comprising:

creating, in a data storage device, multiple logical compartments for an ordered list of elements wherein each logical compartment of the multiple logical compartment holds a portion of the ordered list of elements, and each of the multiple logical compartments comprise a pointer to a successive logical component in an order of the ordered list such that a last item in a logical compartment contains a pointer to a first item in the successive logical compartment;

for each of the multiple logical compartments, encapsulating each element of the portion of the ordered list of elements held in the logical compartment in a node wherein each node of the portion comprises a pointer to a successive node in the portion;

creating a list of references, in the data storage device, comprising a pointer to a first node in each of the multiple logical compartments;

creating a compartment count list, in the data storage device, comprising a count of the number of elements in each of the multiple logical compartments to track the number of elements in each of the multiple logical compartments; and finding a logical compartment in which an nth element resides by scanning the list of references to find a pointer that points to a highest element below the nth element or adding the count of the number of elements in each of the multiple logical compartments until just before the sum exceeds an element number of the nth element, to identify a first node in a logical compartment in which the nth element resides.

2. The method of claim 1 and further comprising:
using the pointers in the nodes of the logical compartment in which the nth element resides to navigate to the nth element.

3. The method of claim 2, wherein the logical compartment is found by adding the count of the number of elements in each of the multiple logical compartments until just before the sum exceeds the particular elements to identify a first node in a logical compartment in which the nth element results.

4. The method of claim 1 and further comprising:
receiving a request to insert an mth element in the ordered list between two elements in the ordered list;
using the list of references comprising a pointer to the first node in each of the multiple logical compartments to identify a first node in a logical compartment in which the mth-1 element resides;
using the pointers in the nodes of the logical compartment in which the mth-1 element resides to navigate to the mth-1 element; and
inserting the mth element by:
creating an mth node with pointers to the mth-1 node and a previous mth node;
updating a pointer in the mth-1 node to point to the mth node; and
updating a pointer in the previous mth element to point to the mth node.

5. The method of claim 1 and further comprising:
determining that a first logical compartment of the multiple logical compartments has grown to twice the size of a nominal compartment;
breaking the first logical compartment into two logical compartments;
updating the list of references comprising a pointer to the first node in each of the multiple logical compartments to identify a first node in each of the two logical compartments; and
updating a count on the compartment count list with the number of elements in each of the two logical compartments.

6. The method of claim 5 wherein breaking the first logical compartment into two logical compartments comprises dividing the elements in the first logical compartment into two sets of elements of substantially equal length.

7. The method of claim 1 wherein the count has a nominal value of about 50, a nominal value greater than 50, or a nominal value of between about 10 and 50.

8. The method of claim 1, wherein the count of the number of elements in each of the multiple compartments is a nominal number with a last compartment having less than the nominal number.

9. The method of claim 1, wherein the count of the number of elements in each of the multiple compartments is expressed as a deviation from a nominal number.

10. A non-transitory computer-readable storage medium having instructions for execution by a processor of a machine to perform operations comprising:
    creating, in a data storage device, multiple logical compartments for an ordered list of elements wherein each logical compartment of the multiple logical compartment holds a portion of the ordered list of elements, and each of the multiple logical compartments comprise a pointer to a successive logical component in an order of the ordered list such that a last item in a logical compartment contains a pointer to a first item in the successive logical compartment;
    for each of the multiple logical compartments, encapsulating each element of the portion of the ordered list of elements held in the logical compartment in a node wherein each node of the portion comprises a pointer to a successive node in the portion;
    creating a list of references, in the data storage device, comprising a pointer to a first node in each of the multiple logical compartments,
    creating a compartment count list, in the data storage device, comprising a count of the number of elements in each of the multiple logical compartments to track the number of elements in each of the multiple logical compartments; and
    finding a logical compartment in which an nth element resides by scanning the list of references to find a pointer that points to a highest element below the desired element or adding the count of the number of elements in each of the multiple logical compartments until just before the sum exceeds the particular element, to identify a first node in a logical compartment in which the nth element resides.

11. The non-transitory computer-readable storage medium of claim 10 wherein nodes in a logical compartment include a pointer to a previous node in the logical compartment.

12. The non-transitory computer-readable storage medium of claim 10 wherein the operations further comprise:
    using the pointers in the nodes of the logical compartment in which the nth element resides to navigate to the nth element.

13. The non-transitory computer-readable storage medium of claim 10 wherein the operations further comprise:
    receiving a request to insert an mth element in the ordered list between two elements in the ordered list;
    using the list of references comprising a pointer to the first node in each of the multiple logical compartments to identify a first node in a compartment in which the mth-1 element resides;
    using the pointers in the nodes of the compartment in which the mth-1 element resides to navigate to the mth-1 element; and
    inserting the mth element by:
        creating an mth node with pointers to the mth-1 node and a previous mth node;
        updating a pointer in the mth-1 node to point to the mth node; and
        updating a pointer in the previous mth element to point to the mth node.

14. The non-transitory computer-readable storage medium of claim 10 wherein the operations further comprise:
    determining that a first logical compartment of the multiple logical compartments has grown to twice the size of a nominal compartment;
    breaking the first logical compartment into two logical compartments;
    updating the list of references comprising a pointer to the first node in each of the multiple logical compartments to identify a first node in each of the two logical compartments; and
    updating a count on the compartment count list with the number of elements in each of the two logical compartments.

15. A device comprising:
    a processor; and
    a memory device coupled to the processor and having a program stored thereon for execution by the processor to cause the processor to perform operations comprising:
    creating, in a data storage device, multiple logical compartments for an ordered list of elements wherein each logical compartment of the multiple logical compartment holds a portion of the ordered list of elements, and each of the multiple logical compartments comprise a pointer to a successive logical component in an order of the ordered list such that a last item in a logical compartment contains a pointer to a first item in the successive logical compartment;
    for each of the multiple logical compartments, encapsulating each element of the portion of the ordered list of elements held in the logical compartment in a node wherein each node of the portion comprises a pointer to a successive node in the portion;
    creating a list of references, in the data storage device, comprising a pointer to a first node in each of the multiple logical compartments,
    creating a compartment count list, in the data storage device, comprising a count of the number of elements in each of the multiple logical compartments to track the number of elements in each of the multiple logical compartments; and
    finding a logical compartment in which an nth element resides by scanning the list of references to find a pointer that points to a highest element below the desired element or adding the count of the number of elements in each of the multiple logical compartments until just before the sum exceeds the particular element, to identify a first node in a logical compartment in which the nth element resides.

16. The device of claim 15 wherein nodes in a logical compartment include a pointer to a previous node in the compartment.

17. The device of claim 15 wherein the operations further comprise:
    using the pointers in the nodes of the logical compartment in which the nth element resides to navigate to the nth element.

18. The device of claim 15 wherein the operations further comprise:
    receiving a request to insert an mth element in the ordered list between two elements in the ordered list;
    using the list of references comprising a pointer to the first node in each of the multiple logical compartments to identify a first node in a logical compartment in which the mth-1 element resides;
    using the pointers in the nodes of the logical compartment in which the mth-1 element resides to navigate to the mth-1 element;
    inserting the mth element by:
        creating an mth node with pointers to the mth-1 node and a previous mth node;
        updating a pointer in the mth-1 node to point to the mth node; and
        updating a pointer in the previous mth element to point to the mth node.

19. The device of claim 15 wherein the operations further comprise:
    determining that a first logical compartment of the multiple logical compartments has grown to twice the size of a nominal compartment;
    breaking the first logical compartment into two logical compartments;
    updating the list of references comprising a pointer to the first node in each of the multiple logical compartments to identify a first node in each of the two logical compartments; and
    updating a count on the compartment count list with the number of elements in each of the two logical compartments.

20. The device of claim 19 wherein the operation of breaking the first logical compartment into two logical compartments comprises dividing the elements in the first logical compartment into two sets of elements of substantially equal length.

* * * * *